Dec. 7, 1937.  R. S. McKEEVER  2,101,405
COUPLING
Filed Jan. 12, 1937
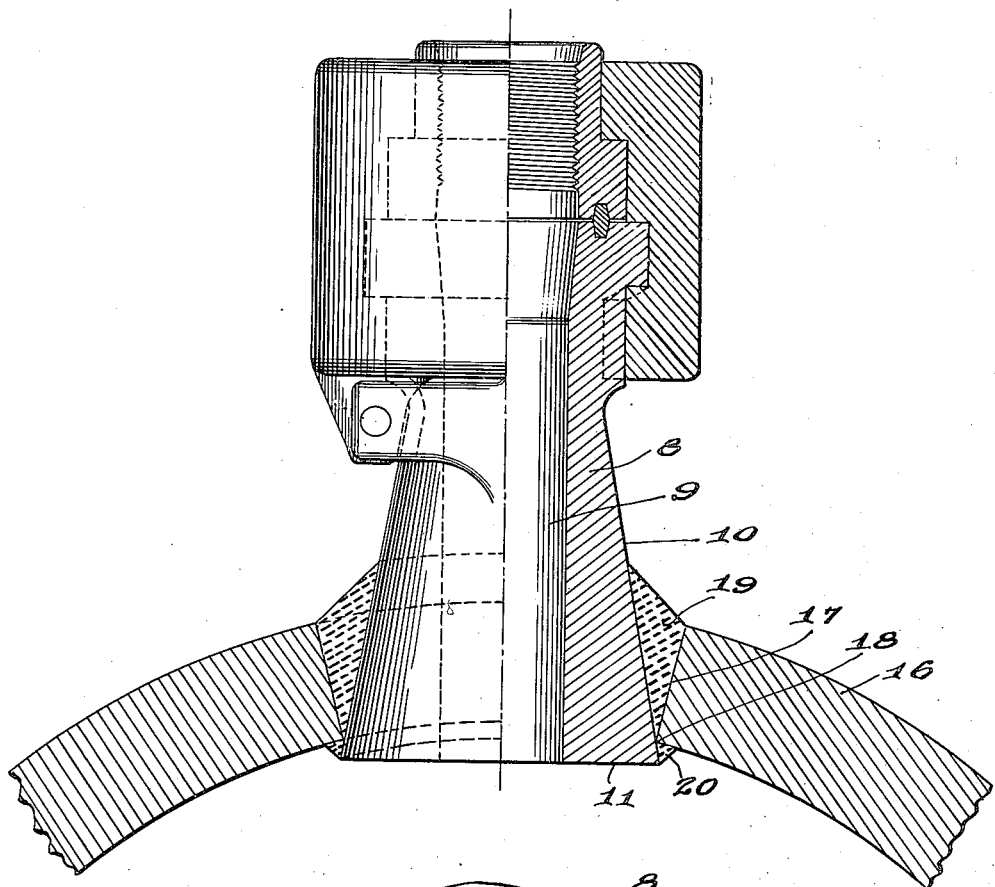
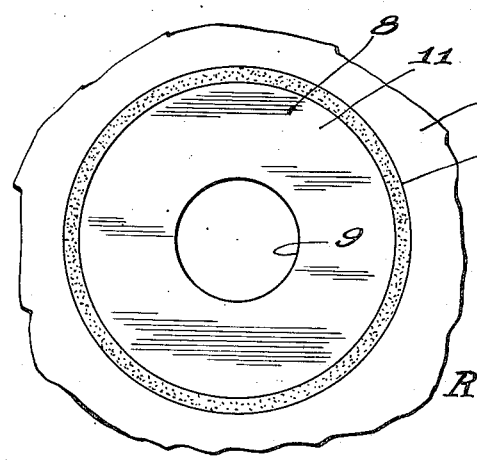
Inventor
R. S. McKeever
By Barry & Cyr
Attorneys Patented Dec. 7, 1937                                                   2,101,405

UNITED STATES PATENT OFFICE 2,101,405

COUPLING

Roy S. McKeever, Tulsa, Okla., assignor to Smith Separator Corporation, Tulsa, Okla., a corporation of Oklahoma Application January 12, 1937, Serial No. 120,303

2 Claims. (Cl. 285—106)

This invention relates to improvements in joints or connections and more especially to a novel coupling designed specifically for use in joining a pipe to a tank or similar vessel.

One of the objects of the invention is to provide a rugged, rigid connection between a nozzle and tank, and one that is leak-proof and capable of withstanding high pressures.

With the foregoing objects outlined and with other objects in view which will appear as the description proceeds, the invention consists in the novel features hereinafter described in detail, illustrated in the accompanying drawing and more particularly pointed out in the appended claims.

In the drawing:

Fig. 1 is a sectional view of a portion of a tank with the improved nozzle and coupling attached thereto; the nozzle and coupling being shown partly in longitudinal section and partly in elevation.

Fig. 2 is an elevation of the structure viewed from the inner end of the nozzle.

Referring to the drawing, 8 designates the nozzle, which is provided with a cylindrical bore 9 and a flared external surface 10 that enlarges toward the inner end 11 of the nozzle.

The outer end of the nozzle is provided with a novel coupling which is claimed in my divisional application, Serial No. 137,152, filed April 15, 1937.

In order to connect the nozzle to the wall 16 of a tank or the like, the latter is provided with an outwardly flared port 17 of larger diameter than the outer end of the nozzle but of smaller diameter than its inner end. Consequently, when the nozzle is inserted in the port from the interior of the tank, the flared surface 10 will come in contact with the annular edge 18 of the port. At this time a ring of welding metal 19 is placed between the flared surfaces of the nozzle and port, and such ring is preferably of triangular cross section, as shown, so that the metal extends outwardly for some distance along the flared surface of the nozzle.

Another ring 20 of welding metal is made between the inner surface of the tank wall and the flared surface of the nozzle, and it is obvious that these two weld rings will securely connect the nozzle to the wall of the tank in such a way as to prevent leakage and to withstand high pressures.

The increased thickness of the nozzle near its base or inner end provides additional reinforcing of the nozzle to take care of metal removed from the wall 16 of the vessel or tank, which is one of the requirements of the Api-Asme Code of 1936. The former construction of the Api-Asme Code specification was an additional pad or reinforcement welded on as a ring or circular piece of metal separate from the nozzle, but the reinforcement is taken care of in the present invention by flaring the base of the nozzle.

The herein disclosed and illustrated embodiments of the invention have given satisfactory results and it will be manifest to those skilled in the art, after an understanding of the invention, that other changes and modifications may be made without departing from the spirit or scope of the invention. It is intended that all matters contained in the above description or shown in the drawing shall be interpreted as illustrative and not in a limiting sense.

What I claim and desire to secure by Letters Patent is:

1. In a structure of the character described, a metallic wall having a port therein, a metallic nozzle having a thickened base portion, said base portion having an external flared surface extending through said port and abutting against the wall surrounding said port, one end of the base portion being of larger diameter than the port to prevent the nozzle from passing therethrough, and welding metal securing the nozzle to the wall of said port.

2. In a structure of the character described, a metallic wall having a flared port therein, a metallic nozzle having a gradually thickened base portion, said base portion having an external flared surface extending through said port and abutting against the wall surrounding the port, one end of the base portion being of larger diameter than the port to prevent the nozzle from passing therethrough, and a ring of welding metal joining the flared surface of the nozzle to the port and extending outwardly along the nozzle beyond said wall.

ROY S. McKEEVER.